(12) United States Patent
Makhija et al.

(10) Patent No.: US 11,593,743 B2
(45) Date of Patent: Feb. 28, 2023

(54) RISK MANAGEMENT SYSTEM INTERFACE

(71) Applicant: PayPal, Inc., San Jose, CA (US)

(72) Inventors: Arthi Rajan Makhija, San Jose, CA (US); Neeti Deshmukh, San Jose, CA (US); Grahame Andrew Jastrebski, San Jose, CA (US); Souradeep Sen, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 69 days.

(21) Appl. No.: 16/237,560

(22) Filed: Dec. 31, 2018

(65) Prior Publication Data

US 2020/0210914 A1 Jul. 2, 2020

(51) Int. Cl.
| | |
|---|---|
| *G06Q 10/06* | (2012.01) |
| *G06F 9/54* | (2006.01) |
| *G06F 3/04842* | (2022.01) |
| *G06F 11/34* | (2006.01) |
| *G06Q 10/0635* | (2023.01) |
| *G06Q 20/40* | (2012.01) |

(52) U.S. Cl.
CPC ..... *G06Q 10/0635* (2013.01); *G06F 3/04842* (2013.01); *G06F 9/54* (2013.01); *G06F 11/3495* (2013.01); *G06Q 20/4016* (2013.01)

(58) Field of Classification Search
None
See application file for complete search history.

(56) References Cited

U.S. PATENT DOCUMENTS

| | | | | |
|---|---|---|---|---|
| 8,584,219 | B1* | 11/2013 | Toole | H04L 63/08 726/25 |
| 8,600,873 | B2* | 12/2013 | Fisher | G06Q 30/0185 705/38 |
| 8,666,861 | B2* | 3/2014 | Li | G06Q 40/00 705/35 |
| 10,067,228 | B1* | 9/2018 | Steenstrup | G01S 15/88 |
| 10,867,303 | B1* | 12/2020 | Manapat | G06Q 10/067 |
| 11,119,630 | B1* | 9/2021 | Marchetti | G06N 5/04 |
| 2001/0056398 | A1 | 12/2001 | Scheirer | |

(Continued)

OTHER PUBLICATIONS

B. R. Amarasekara and A. Mathrani, "Controlling risks and fraud in affiliate marketing: A simulation and testing environment," 2016 14th Annual Conference on Privacy, Security and Trust (PST), Auckland, 2016, pp. 353-360, doi: 10.1109/PST.2016.7906986. (Year: 2016).*

(Continued)

*Primary Examiner* — Darlene Garcia-Guerra

(57) ABSTRACT

A method may include generating a user interface (UI) to facilitate interaction with a risk management system. The UI may include a first element indicating a rule used by the risk management system to manage risk for a client, a second element indicating effectiveness of the rule, and a third element invocable to modify the rule. The method may also include monitoring activity of the client to determine whether the activity of the client shifts the client into a different category of client; determining that the client is shifted into the different category; based on the shift, modifying the second element to include a recommended modification to the rule; and in response to receiving an interaction with the second element, applying the recommended modification to the rule.

18 Claims, 9 Drawing Sheets

(56) References Cited

U.S. PATENT DOCUMENTS

| | | | |
|---|---|---|---|
| 2002/0099649 A1* | 7/2002 | Lee | G06Q 40/06 |
| | | | 705/38 |
| 2002/0120559 A1* | 8/2002 | O'Mara | G06Q 40/025 |
| | | | 705/38 |
| 2006/0226216 A1 | 10/2006 | Keithley et al. | |
| 2006/0282660 A1 | 12/2006 | Varghese et al. | |
| 2007/0022027 A1* | 1/2007 | Gupta | G06Q 40/00 |
| | | | 705/35 |
| 2007/0180490 A1* | 8/2007 | Renzi | G06F 21/604 |
| | | | 726/1 |
| 2010/0305993 A1* | 12/2010 | Fisher | G06Q 10/0635 |
| | | | 705/7.28 |
| 2010/0324945 A1* | 12/2010 | Hessing | G06Q 40/08 |
| | | | 705/4 |
| 2011/0022541 A1* | 1/2011 | Miles | G06Q 40/00 |
| | | | 705/36 R |
| 2012/0130853 A1* | 5/2012 | Petri | G06Q 30/0609 |
| | | | 705/26.35 |
| 2013/0054438 A1* | 2/2013 | Boding | G06Q 20/405 |
| | | | 705/35 |
| 2013/0132275 A1* | 5/2013 | Enzaldo | G06Q 40/02 |
| | | | 705/44 |
| 2013/0138563 A1* | 5/2013 | Gilder | G06Q 20/4016 |
| | | | 705/44 |
| 2013/0212006 A1* | 8/2013 | Siddens | G06Q 20/4016 |
| | | | 705/39 |
| 2014/0058914 A1* | 2/2014 | Song | G06Q 40/06 |
| | | | 705/35 |
| 2014/0201077 A1* | 7/2014 | Cama | G06Q 20/405 |
| | | | 705/44 |
| 2015/0242773 A1* | 8/2015 | Major | G06Q 10/0635 |
| | | | 705/7.28 |
| 2016/0117466 A1 | 4/2016 | Singh | |
| 2016/0283875 A1 | 9/2016 | Birdi | |
| 2018/0108016 A1* | 4/2018 | Jin | G06Q 20/40 |
| 2018/0285876 A1 | 10/2018 | Vrtic et al. | |
| 2019/0333069 A1* | 10/2019 | Noble | G06Q 20/0855 |
| 2019/0354982 A1* | 11/2019 | Gómez | G06Q 20/305 |
| 2020/0005310 A1* | 1/2020 | Kumar | G06Q 20/4016 |
| 2020/0045069 A1* | 2/2020 | Nanda | G06N 7/005 |
| 2020/0053127 A1* | 2/2020 | Brotherton | H04L 63/1416 |

OTHER PUBLICATIONS

Santomero, Anthony M. "Commercial bank risk management: an analysis of the process." Journal of Financial Services Research 12.2 (1997): 83-115. (Year: 1997).*

Ambira, Cleophas, and Henry Kemoni. "Records management and risk management at Kenya Commercial Bank Limited, Nairobi." South African Journal of Information Management 13.1 (2011): 1-11 (Year: 2011).*

Folkeson, My, and Matilda Danielsson. "Risk management in a customer-owned bank. A case study of Länsförsäkringar Bank." (2015) (Year: 2015).*

International Application No. PCT/US2019/068901, International Preliminary Report on Patentability dated Jul. 15, 2021, 19 pages.

International Application No. PCT/US2019/068901, International Search Report and Written Opinion dated Apr. 29, 2020, 21 pages.

Extended European Search Report in EP Appl. No. 19907034.3 dated Sep. 2, 2022, 8 pages.

* cited by examiner

RISK MANAGEMENT SYSTEM INTERFACE

FIELD

The embodiments discussed in the present disclosure are related to interfacing with risk management systems.

BACKGROUND

Some systems provide functionality and expertise that is desirable to other systems. However, access to such systems may be limited.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
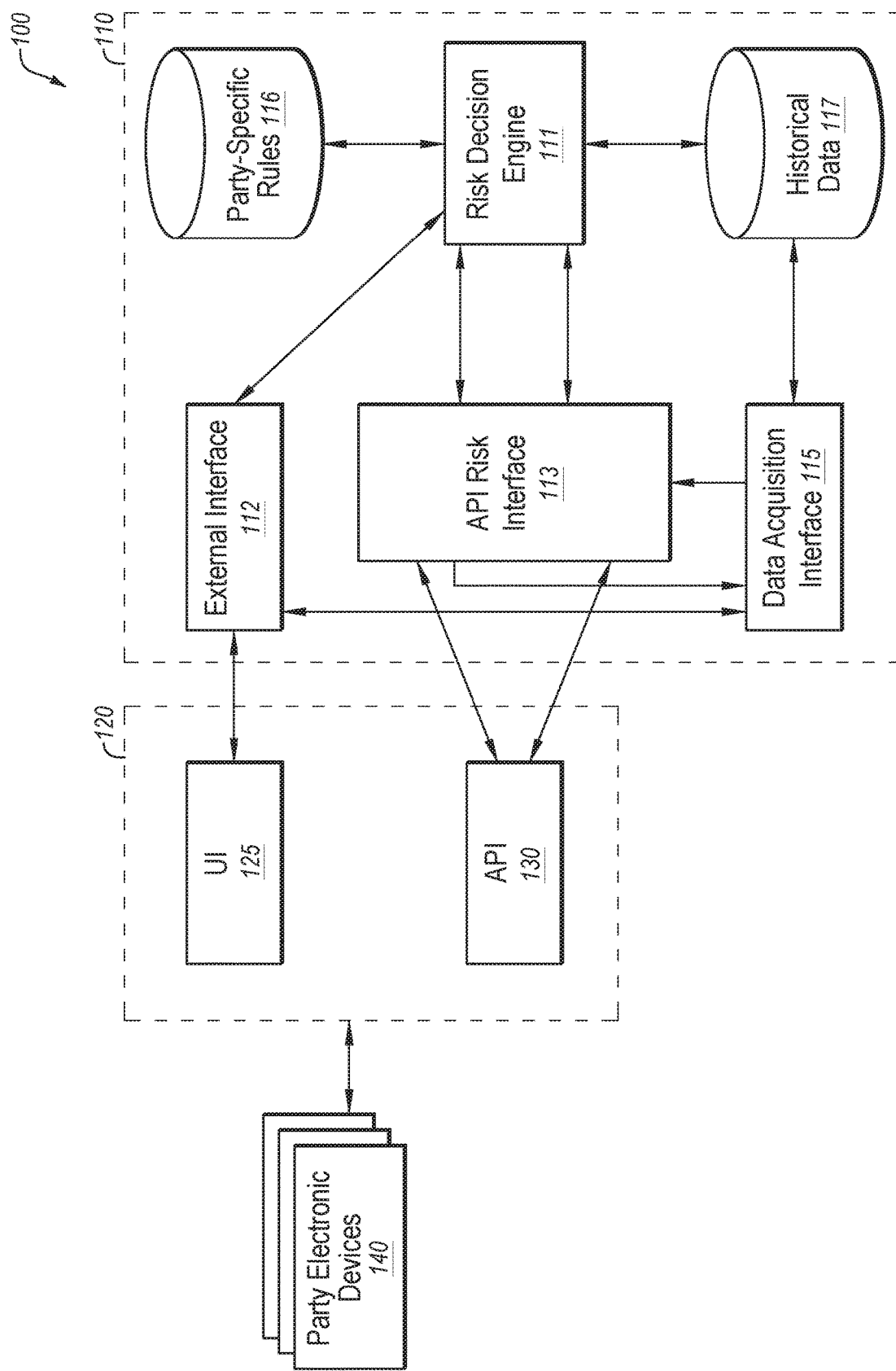
FIG. 1 illustrates a system to facilitate interfacing with a risk management system.

The present disclosure may relate to the interfacing of a risk management system that includes a risk decision engine with a client system such that the client system may use the risk management capabilities of the risk management system. For example, the client system may invoke the risk management system via application program interface (API) calls, scripts, or other communications to leverage the risk management system to facilitate the management of risk by the client system. Additionally or alternatively, the client system may interface with a user interface provided by the risk management system via which the client system may invoke one or more features of the risk management system.

The present disclosure may also relate to the use of the risk management system in certain scenarios. For example, the client system may interface with the risk management system to leverage the risk decision engine to determine a risk factor for permitting an additional party to utilize the services offered by the client system. In these and other embodiments, the risk decision engine may periodically update the risk factor for such a party. As another example, the client system may interface with the risk management system to verify a risk factor associated with a transaction between two parties via the client system.

The embodiments of the present disclosure solve an important problem existing solely in the context of computing systems. For example, a client system may have an established relationship with a party with an account with the client system such that the party consistently interacts with the client system. However, to utilize a risk management system to manage risk of the client system, the client system may traditionally be required to redirect the electronic device of the party to the risk management system, resulting in a loss of relationship between the client system and the electronic device of the party, as well as the lack of a consistent user experience regarding all interactions with the client system. The present disclosure facilitates the electronic device of the party remaining interfaced with the client system while permitting the client system to leverage risk management of the risk management system.

Additionally, the present disclosure provides functionality via a user interface which has not previously been accessible. For example, the present disclosure describes a user interface with an element that permits a third party risk management system to monitor and propose modifications to rules used to manage the risk of a client system. By invoking the user interface the proposed modifications may be implemented to facilitate the management of the risk of the client system. Furthermore, the risk management system may facilitate the management of risk, including the generation of risk factors, for a variety of client systems in a variety of different spaces simultaneously in a variety of jurisdictions and locales, including for hundreds or thousands of client systems.

Embodiments of the present disclosure are explained with reference to the accompanying drawings.

FIG. 1 illustrates a system 100 to facilitate interfacing with a risk management system, in accordance with one or more embodiments of the present disclosure. The system 100 may include a risk management system 110 that interfaces with a client system 120 via one or both of a user interface (UI) 125 and/or an application program interface (API) 130. The risk management system 110 may include risk decision engine 111 to facilitate determination of risk factors, and other tasks associated with the risk management system 110, an external interface 112 for interfacing with the UI 125, an API Risk interface 113 for receiving API calls from the API 130 and for sending information back in response to API calls, a data acquisition interface 115 for obtaining data to be used by the risk management system 110, a client-specific rules database 116, and a historical data database 117.

In some embodiments, the client system 120 may offer services for which there is an associated risk with the service to one of the client system 120 and/or a party associated with a party electronic device 140 utilizing the services of the client system 120. For example, the client system 120 may offer a marketplace where a first party may offer goods or services for sale and a second party may purchase the goods or services from the first party via the client system 120. For example, the first party may use an electronic device 140 to interact with the client system 120 to list a good or service for sale and the second party may utilize an electronic device 140 to interact with the client system 120 to purchase the goods or services offered by the first party. In these and other embodiments, there are risks associated with the party listing the goods or services for sale (e.g., will the selling party actual ship the goods, are the goods stolen/gray market goods, will the seller stand behind any offered warranties, etc.). Additionally or alternatively, there are risks associated with the party buying the goods or services listed for sale (e.g., is the party who they say they are, is the payment method stolen, has the user account been compromised, etc.). As another example in addition to the marketplace, the client system 120 itself may offer goods or services for sale that a party may purchase by interacting with the client system 120 via the party electronic device 140.

In offering services for which there is an associated risk, the client system 120 may interface with the risk management system 110 for management of the risk associated with the services offered. For example, the client system 120 may interface with the risk management system 110 to identify whether or not a party seeking to sell goods or services through the client system 120 is a risk for the client system 120 as the party seeking to sell goods is unlikely to deliver the goods being sold. Other examples are provided below, including with reference to FIGS. 5-7.

Figure 3A:
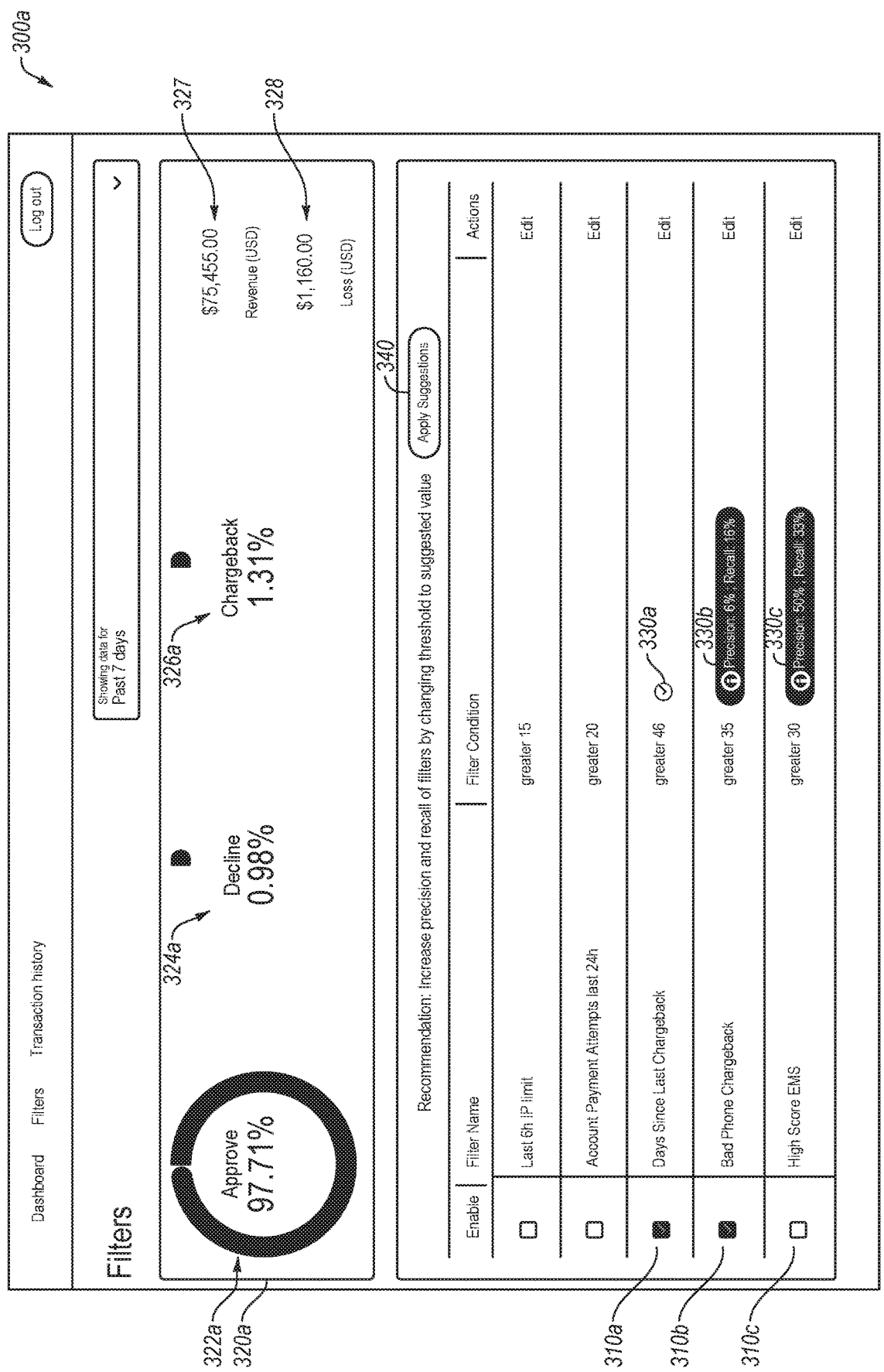
FIGS. 3A and 3B illustrate example user interfaces utilized in interfacing with a risk management system.
Figure 3B:
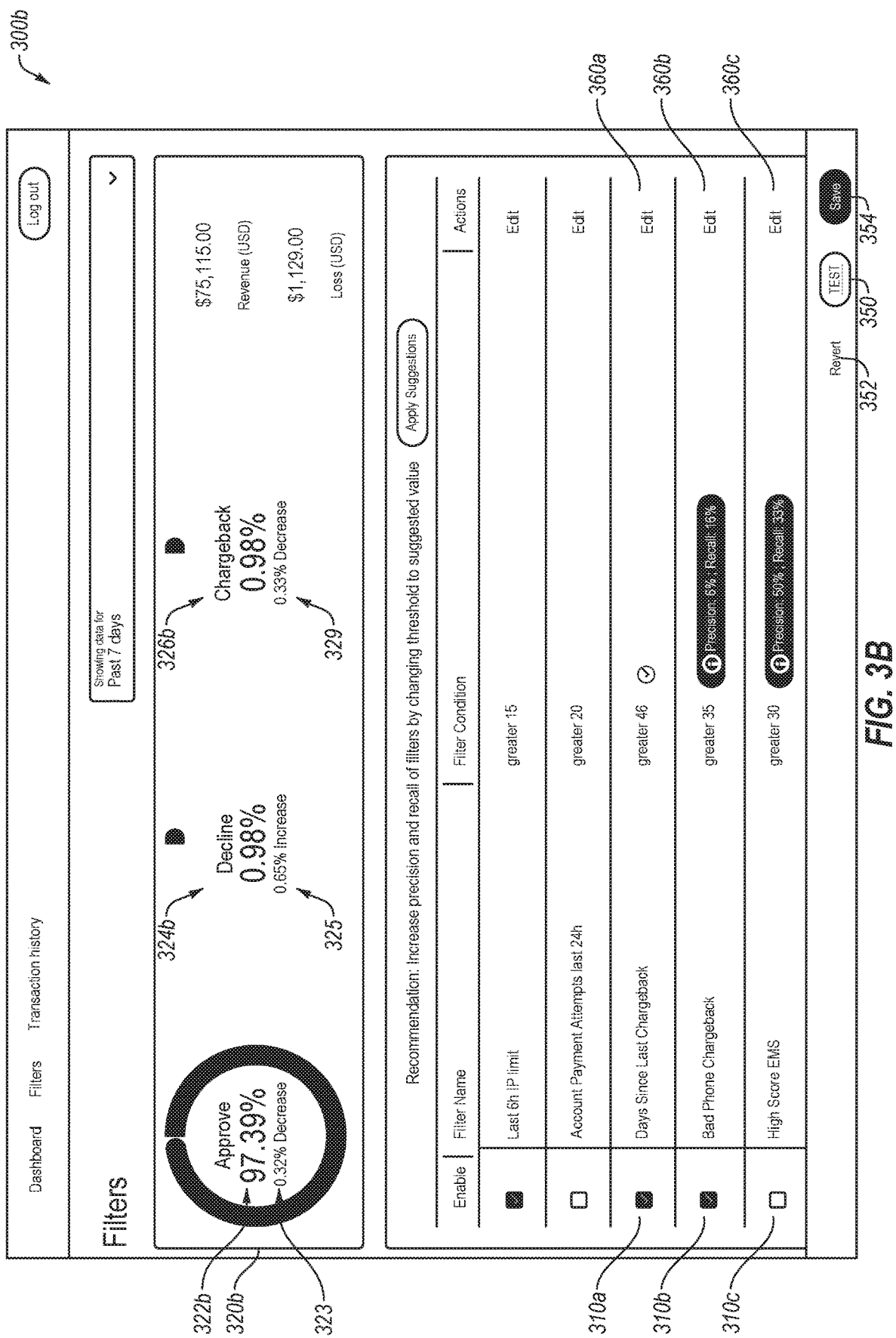
Figure 4:
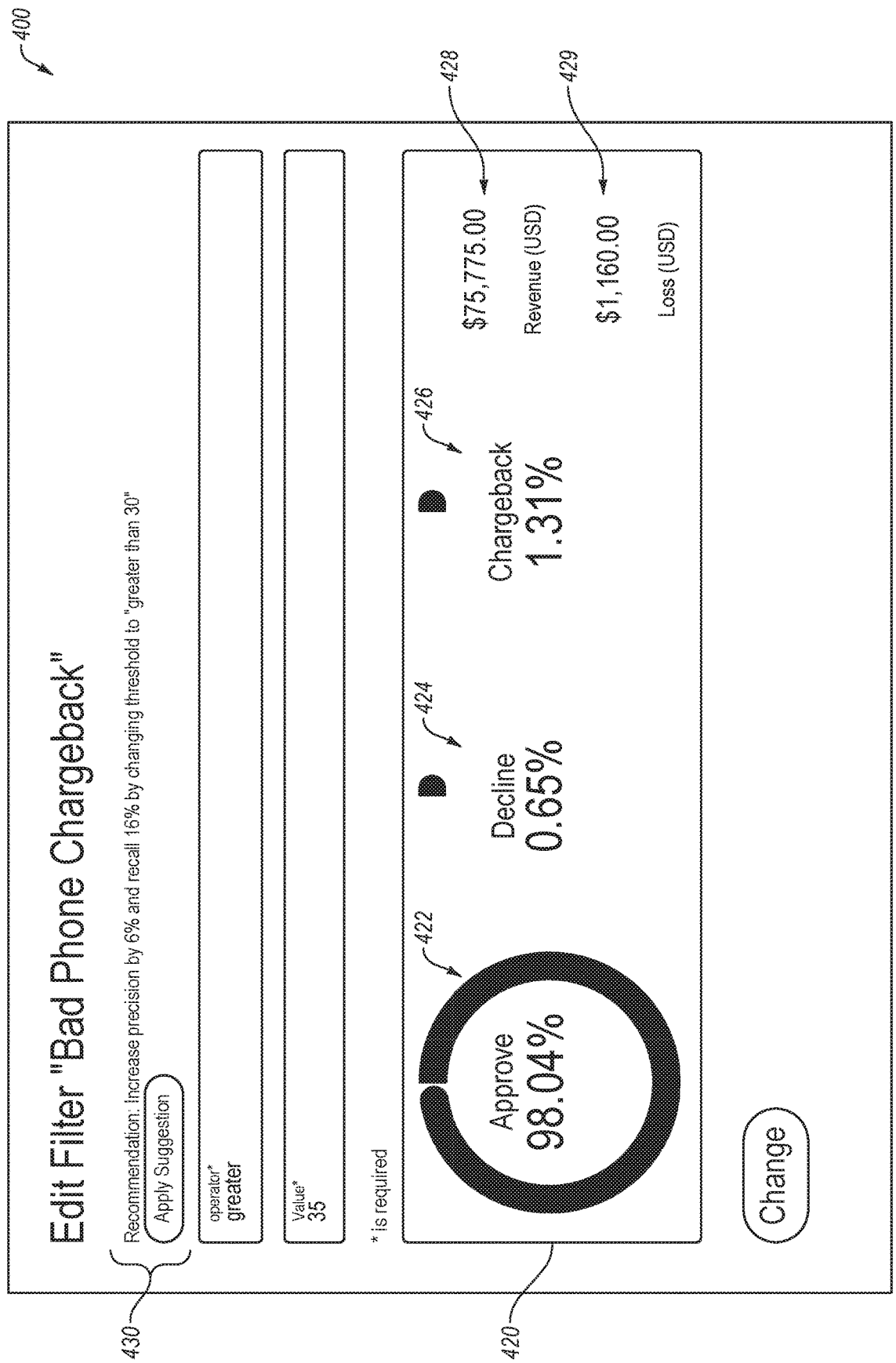
FIG. 4 illustrates another example user interface utilized in interfacing with a risk management system.

In some embodiments, the client system 120 may interface with the risk management system 110 via the UI 125. The UI 125 may include any user interface via which a user of the client system 120 may invoke one or more features or services of the risk management system 110. For example, the UI 125 may include one or more elements that, when invoked, provide a message via the external interface 112 to cause the risk decision engine 111 to perform some task such as updating a rule. Some examples of such user interfaces are illustrated in FIGS. 3A, 3B, and 4.

In some embodiments, the client system 120 may interface with the risk management system 110 via the API 130. The API 130 may include any programming commands or calls that may be invoked by the client system 120 and received by the API risk interface 113 of the risk management system. For example, the API 130 may include one or more functions that, when invoked, provide a message via the external interface 112 to cause the risk decision engine 111 to perform some task, such as determining a risk factor for a new party seeking to list good or services with the client system 120.

In some embodiments, the client system 120 may invoke the risk management system 110 to use one or more rules that are specific to the client system 120 and/or specific to parties interacting with the client system 120 via the party electronic devices 140. In these and other embodiments, the client system 120 may provide, designate, or otherwise select the rules to be used in managing the risk of the client system 120. For example, the risk decision engine 111 of the risk management system 110 may obtain data regarding the client system 120 (e.g., the physical location of the client system 120, the types of goods or services to be listed with the client system 120, the locations to which the goods or services may be shipped/provided, the cost of the good or services being listed, etc.). Based on the data, and comparing the data to historical data such as that stored in the historical data database 117, the risk decision engine 111 may recommend a set of rules to be used. In these and other embodiments, the risk decision engine may continue to monitor the activity of the client system 120 and may update or otherwise recommend modifications to the rules employed to manage the risk of the client system 120. For example, an initial recommendation of rules by the risk decision engine 111 may be based on an initial category of client. However, after monitoring the services provided to other electronic devices by the client system 120, the risk decision engine may determine that the client system 120 may belong to a different category of client and may recommend modifying or adjusting the rules accordingly to better match the rules used by clients in the different category. For example, if the client system 120 is operating in a more risky space, the risk decision engine 111 may recommend more stringent rules.

In some embodiments, the rules may include any policy or standard by which the risk decision engine 111 may provide a recommendation and/or otherwise manage the risk of the client system 120. Examples of such rules may include a limit on a number of transactions within a six hour period from the same IP address, a limit on a number of account payments within a twenty-four hour period, a number of days since the last chargeback for the client system, a transaction risk factor threshold, a party risk factor threshold, a number of transaction retries within a thirty minute period, etc. In these and other embodiments, the risk decision engine may store the client- and/or party-specific rules in the client-specific rules database 116.

In some embodiments, the risk decision engine 111 may determine a risk factor for a new party desiring to list goods or services with the client system 120. In these and other embodiments, the client system 120 may invoke an API call via the API 130 to the risk management system 110 to be received at the API risk interface 113. The API call may include data regarding the new party. Based on receiving the API call at the API risk interface 113, the API risk interface 113 may route the data to the risk decision engine 111. The risk decision engine may compare the data of the new party to other parties as stored in the historical data database 117 and may determine a corresponding risk factor for the new party. The risk decision engine 111 may provide the risk factor to the API risk interface 113, which may communicate the risk factor for the new party to the client system 120. In these and other embodiments, the client system 120 may utilize the new party risk factor to determine whether or not to permit the new party to utilize the services of the client system 120.

In some embodiments, the risk decision engine 111 may continue to monitor data related to the new party and may provide periodic updates to the client system 120 regarding the risk factor of the new party. For example, the data acquisition interface 115 may obtain data such as chargeback data, lost or stolen credit card information, transaction approvals and/or declines, etc. from the external interface 112 and/or the API risk interface 113. For example, the client system 120 may communicate information regarding transactions the client system 120 has processed and the external interface 112 and/or the API risk interface 113 may provide such data to the data acquisition interface 115. In these and other embodiments, the data acquisition interface 115 may store the data acquired in the historical data database 117. In some embodiments, the data acquisition interface 115 may obtain such data from external payment systems, such as those that may interface with credit card processing companies, banks, etc.

In some embodiments, the party risk factor may include a numerical value indicating a risk with the party listing goods or services for sale with the client system 120 (e.g., a number between 0 and 1000 with 0 being no risk and 1000 being high risk). Additionally or alternatively, the party risk factor may include a textual description of the reason for the risk factor. For example, the risk decision engine 111 may determine that a particular party has a risk score of 650 and may include text such as "RISKY LOCATION" or "HIGH RISK MERCHANDISE," etc.

In some embodiments, the risk decision engine 111 may determine a risk factor for a particular transaction associated with the client system 120. For example, a first party may request to purchase a good or service listed by a second party via the client system 120. The client system 120 may send details regarding the transaction via an API call through the API 130 to the risk management system via the API risk interface 113. The API risk interface 113 may provide the transaction details from the API call to the risk decision engine 111. The risk decision engine 111 may analyze the transaction details and may provide a transaction risk factor for the transaction. For example, the risk decision engine 111 may compare the details of the transaction with historical transactions as stored in the historical data database 117. In response to the API call, the risk decision engine 111 may send back, via the API risk interface 113, the transaction risk factor. Additionally or alternatively, the risk decision engine 111 may send the party risk factor of the party listing the good or service for sale with the transaction risk factor. In these and other embodiments, based on receiving the transaction risk factor, the client system 120 may decide whether or not to approve the transaction or decline the transaction. In some embodiments, insurance or other protection may be provided to the client system 120 for transactions with a risk factor below a threshold level, and may opt out of such protection if the client system 120 elects to approve transactions above the threshold level.

In some embodiments, the transaction risk factor may include a numerical value indicating a risk with the transaction (e.g., a number between 0 and 1000 with 0 being no risk and 1000 being high risk). Additionally or alternatively, the transaction risk factor may include a textual description of the reason for the risk factor. For example, the risk decision engine 111 may determine that a particular transaction has a risk score of 550 and may include text such as "RISK OF LOST CARD" or "FREQUENT TRANSACTION FROM SAME IP," etc.

Modifications, additions, or omissions may be made to the system 100 without departing from the scope of the present disclosure. For example, the system 100 may include more or fewer elements than those illustrated and described in the present disclosure. For example, the system 100 may include any number of client systems interfacing with the risk management system 110, and any number of parties interacting with those client systems.

Figure 2:
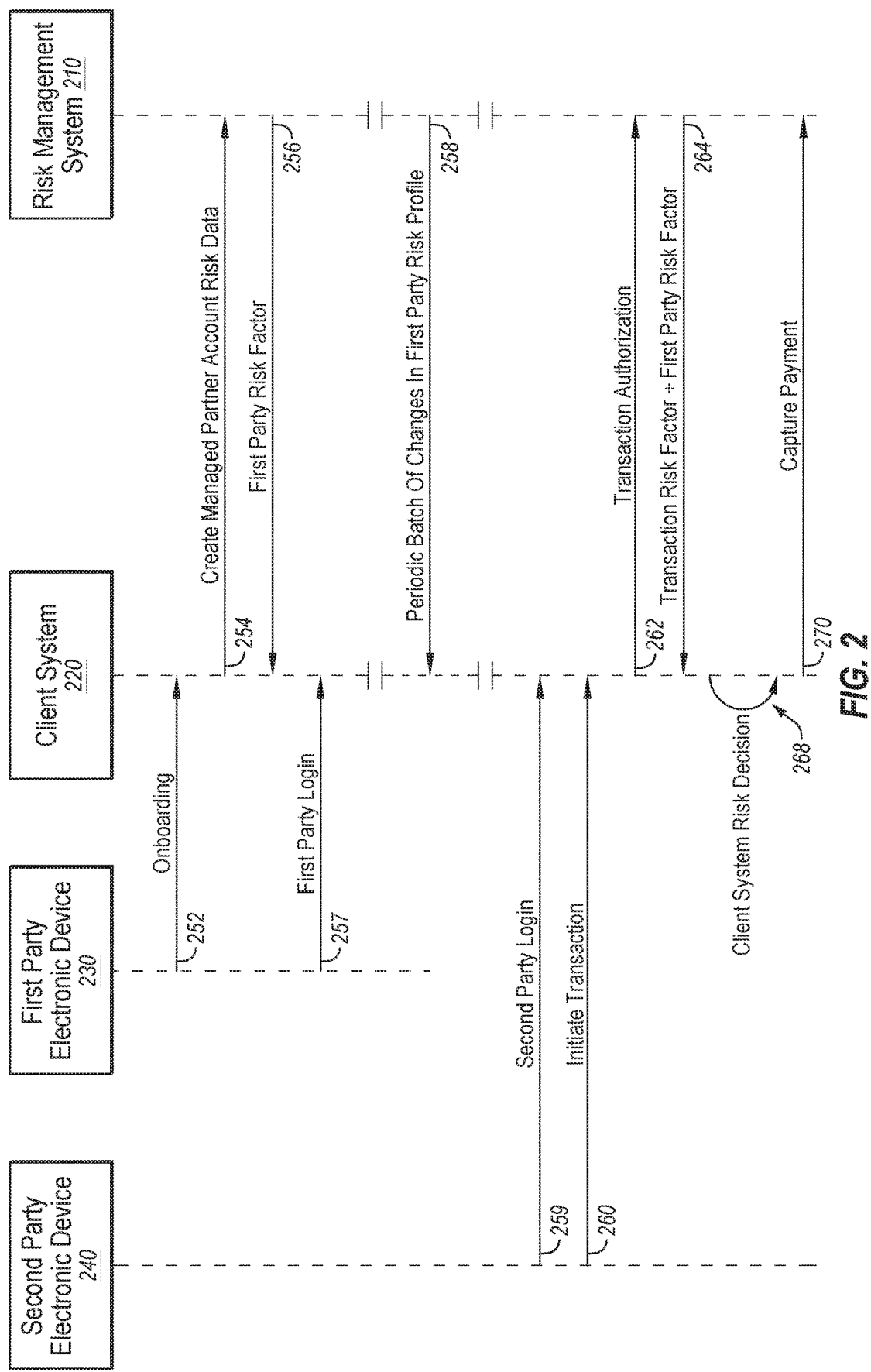
FIG. 2 illustrates an example swim lane diagram associated with interfacing with a risk management system.

FIG. 2 illustrates an example swim lane diagram 200 associated with a client system 220 interfacing with a risk management system 210, in accordance with one or more embodiments of the present disclosure. The swim lane diagram 200 illustrates interactions between the client system 220 and the risk management system 210 when a first party via a first party electronic device 230 is onboarded as a party to take advantage of the services offered by the client system 220 (e.g., the first party may include a seller being onboarded to list goods or services for sale with the client system 220 by utilizing the first party electronic device 230 to interact with the client system 220 to provide information regarding the first party and/or the goods or services that will be listed). The swim lane diagram 200 additionally illustrates the interactions between the client system 220 and the risk management system 210 when a second party via a second party electronic device 240 interacts with the client system 220 (e.g., second party utilizes the second party electronic device 240 to seek to purchase a good or service listed by the first party with the client system 220).

At action 252, the first party may be onboarded. For example, the first party electronic device 230 may submit a request to be permitted to list goods or services for sale with the client system 220. In response, the client system 220 may request certain information from the first party. In response, the first party, via the first party electronic device 230, may submit information regarding the first party, such as physical address, contact information, an example list of goods and/or services to be listed, values of the goods and/or services expected to be listed, length of existence as a seller, other online locations (e.g., a business website of the first party), etc.

At action 254, an API call may be submitted from the client system 220 to the risk management system 210 to create a managed party account associated with the first party. For example, the client system 220 may submit the information received from the first party electronic device 230 to the risk management system 210. The risk management system 210 may route the data to risk decision engine to derive a risk factor for the first party. In some embodiments, the risk factor may include a numerical value and a textual description of the reasons for the numerical value.

At action 256, the risk management system 210 may provide the first party risk factor to the client system 220. For example, the risk decision engine may provide the first party risk factor to an API risk interface of the risk management system 210, which may provide the first party risk factor to the client system 220.

At action 257, the first party electronic device 230 may provide credentials to login to the client system 220. For example, the first party may enter login information such as a username and password into the first party electronic device 230 to be provided to the client system 220. In these and other embodiments the login information provided by the first party electronic device 230 may contribute to an initial determination of the risk factor or an updated risk factor for the first party. For example, if the first party logs in using a multi-factored authorization, utilizes a secure email address, etc., the first party may have a lower risk factor than if the first party logged in using a generic email address.

At action 258, a periodic batch of changes in first party risk factors may be sent from the risk management system 210 to the client system 220. For example, the risk decision engine may track or follow the actions, transactions, interactions, logins, etc. of the first party. Such tracking may include actions with just the client system 220 or may include actions with third party systems in addition to the actions with the client system 220. At a periodic interval (e.g., once per week, once every other week, etc.), the risk decision engine may update the risk factor for the first party and may provide the updated risk factor to the client system 220. In these and other embodiments, the risk decision engine may provide a batch of all parties listing goods or services with the client system 220 with their associated updated risk factors at the periodic interval. In these and other embodiments, the risk decision engine may provide the batch of updated risk factors to the API risk interface which may provide the batch to the client system 220. In some embodiments, the periodic determination of the first party risk factor may be based on changes in activity of the first party. For example, when tracking transactions, if the first party changes their behavior outside of a threshold level of change, the risk management system 210 may update the first party risk factor.

At action 259, the second party electronic device 240 may provide credentials to log in to the client system 220. In these and other embodiments the login information provided by the second party electronic device 240 may contribute to an initial determination of a transaction risk factor. Additionally or alternatively, the login information may be used in determining a risk factor for the second party. For example, if the second party logs in using a multi-factored authorization, utilizes a secure email address, etc., the second party may have a lower risk factor than if the second party logged in using a generic email address.

At action 260, the second party electronic device 240 may initiate a reference transaction with the client system 220 (for example, by the second party providing credit card information via the second party electronic device 240).

At action 262, the client system 220 may invoke an API call to the API risk interface of the risk management system 210 with transaction authorization information. Using the transaction authorization information and/or other information regarding the transaction, the risk decision engine may determine a transaction risk factor. In some embodiments, the transaction risk factor may include an associated textual description of the risk factor. Additionally or alternatively, the risk decision engine may recall the most recent update to the risk factor for the seller.

At action 264, the risk management system 210 may provide the transaction risk factor and/or the first party risk factor for the transaction initiated at action 260. For example, the risk decision engine may provide the transaction risk factor and/or the first party risk factor to the API risk interface, which may provide the risk factor to the client system 220. In some embodiments, the risk management system 210 may determine a risk factor associated with the second party and may provide the second party risk factor. In these and other embodiments, the risk management system 210 may periodically update the second party risk score such that the client system 220 may monitor risk factors for the first party and the second party.

At action 268, the client system 220 may render a risk decision with respect to the transaction. For example, the client system 220 may approve or decline the transaction based on the risk factors provided by the risk management system 210. In some embodiments, the decision at the action 268 may include a decision that is against a recommendation of the risk management system 210 based on a risk level as conveyed by the risk factors.

At action 270, the payment information may be captured and provided to the risk management system 210. For example, the details of the transaction as completed may be provided to the risk management system 210 from the client system 220. Such information may be obtained via an API call, a data acquisition interface, or any other component of the risk management system 110. In these and other embodiments, the information of the transaction may be stored in a historical data database of the risk management system.

Modifications, additions, or omissions may be made to the swim lane diagram 200 without departing from the scope of the present disclosure. For example, the actions of the diagram 200 may be implemented in differing order. Additionally or alternatively, two or more actions may be performed at the same time, repeated, etc. Furthermore, the outlined actions are only provided as examples, and some of the actions may be optional, combined into fewer operations and actions, or expanded into additional actions without detracting from the essence of the disclosed embodiments.

FIGS. 3A and 3B illustrate example user interfaces 300a and 300b utilized in interfacing with a risk management system, in accordance with one or more embodiments of the present disclosure. In some embodiments, the user interfaces 300a and/or 300b may correspond to the UI 125 of FIG. 1 via which a user may interact with the client system 120. Such a user may include an administrator or other entity associated with the client system 120, and/or a party interacting with the client system 120 via the party electronic devices 140. FIG. 3A illustrates the user interface 300a with a number of rules affecting performance metrics of a client system, and FIG. 3B illustrates a potential application of modifications to one or more of those rules.

As illustrated in FIG. 3A, the user interface 300a may include a first set of elements 310 corresponding to rules utilized by the risk management system to manage the risk of a client system and/or as used by the client system to determine when to approve and/or decline transactions. For example, the user interface 300a includes first elements 310a, 310b, and 310c, corresponding to three distinct rules.

The user interface 300a may include a second element 320 corresponding to performance metrics of the client system. For example, a first sub element 322a may correspond to a percentage of transactions that are approved, a second sub element 324a may correspond to a percentage of transactions that are declined, a third sub element 326a may correspond to a percentage of transactions that are charged back, a fourth sub element 327 may correspond to total revenue for the client system, and a fifth sub element 328 may correspond to total loss for the client system. Any performance metrics may be used in addition or alternative to those illustrated in FIGS. 3A and 3B. Additionally, the presentation may be in percentages, raw numbers, etc.

In some embodiments, the user interface 300a may include a third element 330 depicting the performance and/or applicability of a given rule in conjunction with managing the risk of the client system. For example, as illustrated with the element 330a, the rule associated with the element 310a may be performing adequately to manage the risk of the client system. However, recommendations may be provided in conjunction with the elements 330b and 330c, indicating that the performance of the rules associated with the elements 310b and 310c may not be ideal.

In some embodiments, risk decision engine of the risk management system may monitor the performance of the rules selected and/or set by the client system. The user interface elements 330 may be a reflection of the current findings of the risk decision engine as reflected in a user interface accessible to the client device. In some embodiments, the analysis of the performance of the rules may be performed periodically or may be performed on a continuous and ongoing basis.

In some embodiments, the risk decision engine may suggest a modification to one or more of the rules, as illustrated in the elements 330b and 330c. In some embodiments, such modifications may be based on the risk decision engine monitoring the activities and interactions of the client system to determine what category of client to which the client system belongs or should belong. For example, if the client system has shifted to being selling higher risk merchandise, the category of client may change such that modifications to the rules employed by the client system may be warranted, and those modifications may be recommended by the risk management system via the user interface elements 330b and/or 330c.

In some embodiments, the elements 330b and/or 330c may be invokable by a user interacting with the user interface 300a to request that the suggested modification to the applicable rule be applied. For example, a user may invoke the element 330b to modify the rule associated with the element 310b. Additionally or alternatively, a secondary user interface (such as that illustrated in FIG. 4) may be retrieved to facilitate the modification of the rule.

In some embodiments, the user interface 300a may include an element 340 by which a user may invoke the application of all suggested modifications at once, rather than selecting individual rules for modification.

As illustrated in FIG. 3B, the user interface 300b may include elements via which a user may modify one or more of the rules, observe changes in performance metrics based on the modifications, and accept or revert the modifications.

The user interface 300b may include the elements 310a, 310b, and 310c that may be similar or comparable to the same numbered elements from FIG. 3A.

In some embodiments, the user interface 300b may include a test element 350 via which a user of the user interface 300b may invoke a test of the application of a proposed modification to one or more of the rules and observe the effect of modifying the one or more rules. For example, the user may check one or more of the rules with a proposed modification and may invoke the test element 350. By invoking the test element 350, a message may be sent from the client system (such as the client system 120 via interaction with the UI 125) to the risk management system to be routed to the risk decision engine. The risk decision engine may estimate changes to the performance metrics of the client system based on applying the modifications to the rules (e.g., by comparing the statistics of the client system with historical data stored in a historical data database to estimate changes that may be experienced by the client system when the modified rules are applied).

In some embodiments, the estimation in changes to the performance metrics of the client system as estimated by the risk decision engine may be provided to the user interface 300b. In these and other embodiments, the user interface 300b may include an element 320b that includes performance metrics, such as an element 322b illustrating an approval percentage, an element 324b illustrating a decline percentage, and an element 326b illustrating a chargeback percentage. When estimating the changes to the performance metrics based on the modified rules, the element 320b may additionally include elements depicting the estimated changes. For example, the element 323 may depict the changes to the approval percentage, the element 325 may depict the changes to the decline percentage, and the element 329 may depict the changes to the chargeback percentage.

In some embodiments, the user interface 300b may include one or more other elements related to modifying the rules associated with the elements 310. For example, an edit element 360 (such as the edit elements 360a, 360b, and 360c) may permit a single rule to be modified manually. An example of a user interface presented when the element 360 is invoked is described in greater detail with reference to FIG. 4. As another example of the other elements, the user interface 300b may include a revert element 352 to undo the application of modifications to the rules. For example, after invoking the test element 350, the user may choose to invoke the revert element 352 or a save element 354 to apply the modifications. Additionally or alternatively, the revert element 352 may be utilized to undo a most recent set of modifications to rules that were applied.

Modifications, additions, or omissions may be made to the user interfaces 300a/300b without departing from the scope of the present disclosure. For example, the user interfaces 300a/300b may include more or fewer elements than those illustrated and described in the present disclosure. For example, the user interfaces 300a/300b may include any number of user interface elements, any number of which may be configured to be invoke various features of a risk management system.

FIG. 4 illustrates another example user interface 400 utilized in interfacing with a risk management system, in accordance with one or more embodiments of the present disclosure. In some embodiments, the user interface 400 may correspond to the UI 125 of FIG. 1 via which a user may interact with the client system 120. Such a user may include an administrator or other entity associated with the client system 120, and/or a party interacting with the client system 120 via the party electronic devices 140. The user interface 400 may depict a user interface via which a user of a client system may modify a specific rule. The user interface 400 may include a heading depicting the rule that has been selected for modification. Additionally or alternatively, the user interface 400 may include an element 420 depicting performance metrics, and an element 430 depicting a recommended modification to a rule.

The element 420 may be similar or comparable to the element 320 of FIGS. 3A and 3B, although with changes depicting potential changes for the modification of the particular rule being modified rather than reflecting the changes of modifications to potentially multiple rules. The element 420 may include an element 422 illustrating an approval percentage, an element 424 illustrating a decline percentage, an element 426 illustrating a chargeback percentage, an element 428 depicting revenue for the client system, and an element 429 depicting loss for the client system. As values associated with the rule are modified, the element 420 may include estimated changes to the performance metrics, which may be determined in a similar or comparable manner as described with reference to FIG. 3B.

The element 430 may be invokable by a user of the client system to apply a recommended modification. In some embodiments, text associated with the element 430 may indicate changes to one or more performance metrics that may be obtained by applying the suggested modification to the rule. In these and other embodiments, if no modification is recommended the element 430 may reflect that the rule is already set at a desirable level. Additionally or alternatively, if the risk decision engine does not have sufficient data to provide a recommendation or otherwise assess the effectiveness of the particular rule, the element 430 may indicate that additional data may be required before a recommendation is provided, and may include an estimation of time or events at which point the risk decision engine may have access to a sufficient amount of data.

Modifications, additions, or omissions may be made to the user interface 400 without departing from the scope of the present disclosure. For example, the user interface 400 may include more or fewer elements than those illustrated and described in the present disclosure. For example, the user interface 400 may include any number of user interface elements, any number of which may be configured to be invoke various features of a risk management system. For example, the user interface 400 may include elements via which a user may modify values or operators associated with a rule, elements for applying or reverting changes, elements for switching between rules, etc.

Figure 5:
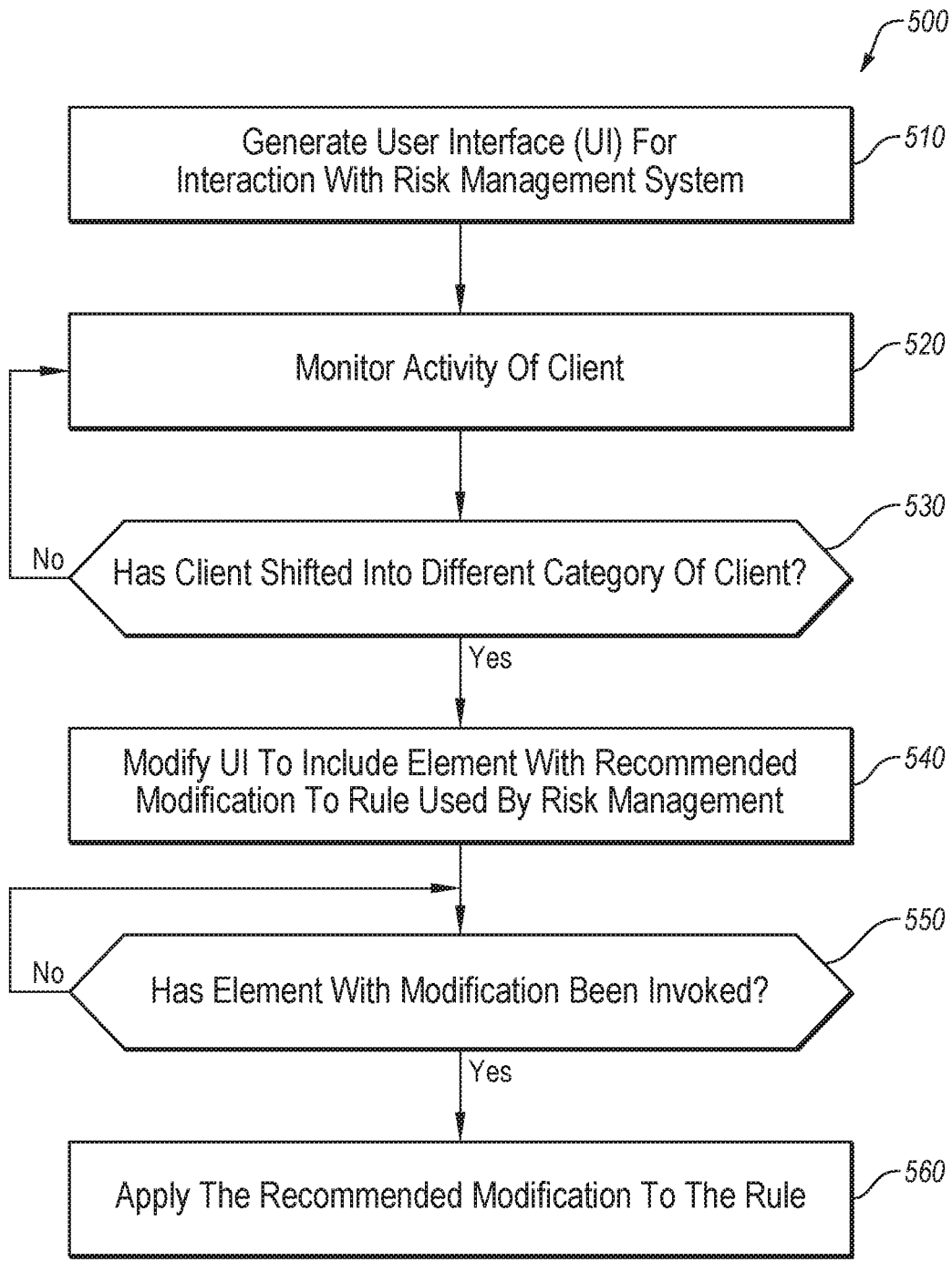
FIG. 5 illustrates a flowchart of an example method of interfacing with a risk management system.

FIG. 5 illustrates a flowchart of an example method 500 of interfacing with a risk management system, in accordance with one or more embodiments of the present disclosure. The method 500 may be performed by any suitable system, apparatus, or device with respect to dispute resolution for a hosting system. For example, the client system 120 and/or the risk management system 110 of FIG. 1, or the computing system 800 of FIG. 8 may perform or direct performance of one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

At block 510, a user interface (UI) for interaction with a risk management system may be generated. For example, the risk management system may generate a UI with elements via which a user of a client system utilizing the risk management system may invoke one or more features or functionalities of the risk management system. Examples of such user interfaces may be depicted in FIGS. 3A, 3B and/or 4, and may correspond to the UI 125 of FIG. 1. The UI may include an element that depicts at least one rule used by the client system and/or the risk management system to manage the risk of the client system. Additionally or alternatively, the UI may include an element depicting the effectiveness of the rules (such as performance metrics of the client system), and an element that may be invoked to modify the rule.

At block 520, activity of the client system may be monitored. For example, risk decision engine of the risk management system may track the types of transactions being undertaken by parties using the client system, the locations of goods or services being provided by parties using the client system, the amount of transactions being undertaken by the parties using the client system, the number of transactions being approved by the client system, the number of transactions being declined by the client system, the number of transactions being charged back to the client system, etc. The monitored activity may be stored in a historical data database by the risk decision engine.

At block 530, a determination may be made whether the client system has shifted into a different category of client. For example, different categories of clients may be designated based on characteristics of their activity, and may utilize different rules when managing their risk. For example, client systems that operate in a risky geographical location may utilize (or be recommended to utilize) more stringent rules than client systems operating in a more secure geographical location. If the activity of the client system being monitored at the block 520 indicates that the client has shifted into a different category, the method 500 may proceed to the block 540. If the activity of the client system being monitored indicates that the client has remained in the same category, the method 500 may return to the block 520 to continue to monitor the activity of the client system.

At block 540, the UI may be modified to include an element with a recommended modification to the rule used by the risk management system that is consistent with the new category. For example, if the activity of the client has shifted the client into a category of more risky client systems, the risk decision engine may recommend one or more of the rules be modified to be more stringent consistent with the new category. In some embodiments, the risk decision engine may maintain a set of recommended rules for each category of client systems, and as a client system enters a given category (either as a new client system or based on their monitored activity), the risk decision engine may recommend new rules or modification of existing rules to be consistent with the set of recommended rules for the category. In some embodiment, the modification to the UI may include the modification of an existing element of the UI or adding a new element to the UI.

At block 550, a determination may be made whether the element with the recommended modification has been invoked by a user of the client system. If the element has been invoked, the method 500 may proceed to the block 560. If the element has not been invoked, the method 500 may return to the block 550 to continue to monitor whether or not the element has been invoked. In these and other embodiments, the other operations may additionally or alternatively be performed while the method waits to observe invocation of the element with the modified rule. For example, the activity of the client system may continue to be monitored and/or additional rule recommendations may be provided.

At block 560, the recommended modification to the rule may be applied. For example, based on the user of the client system invoking the element, the risk decision engine may utilize the modified rule when managing the risk of the client system. Additionally or alternatively, if the client system is the one applying the rule, the risk determination system may update a client specific database to reflect the modified rule such that the risk decision engine may provide the appropriate recommendations in the future.

Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 6:
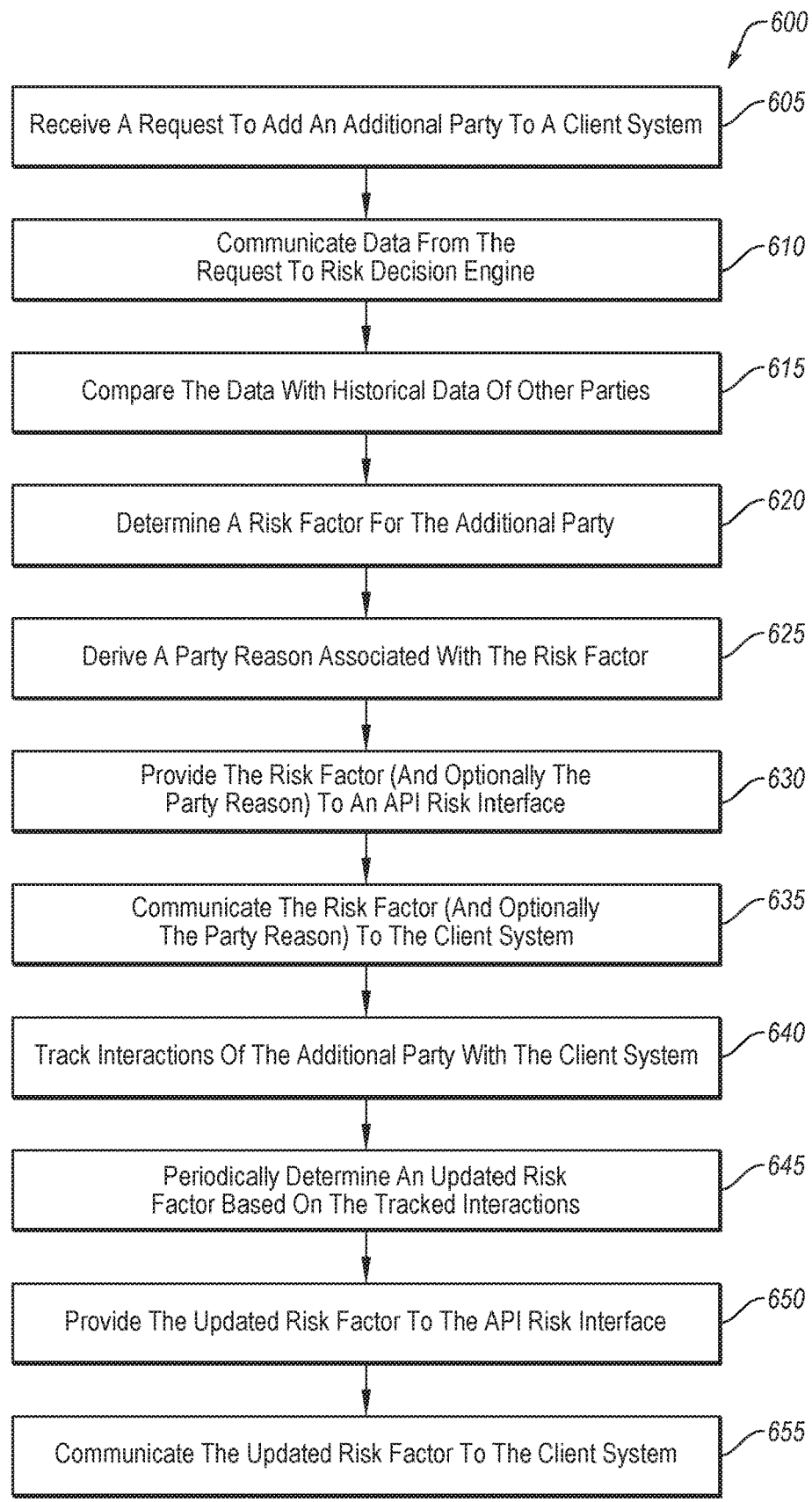
FIG. 6 illustrates a flowchart of another example method of interfacing with a risk management system.

FIG. 6 illustrates a flowchart of another example method 600 of interfacing with a risk management system, in accordance with one or more embodiments of the present disclosure. The method 600 may be performed by any suitable system, apparatus, or device with respect to dispute resolution for a hosting system. For example, the client system 120 and/or the risk management system 110 of FIG. 1, or the computing system 800 of FIG. 8 may perform or direct performance of one or more of the operations associated with the method 600. Although illustrated with discrete blocks, the steps and operations associated with one or more of the blocks of the method 600 may be divided into additional blocks, combined into fewer blocks, or eliminated, depending on the particular implementation.

At block 605, a request may be received to add an additional party to a client system. For example, a risk management system may receive an API call at an API, the API call including information regarding a party seeking to be able to list goods or services with the client system.

At block 610, the request and data associated therewith may be communicated to risk decision engine of the risk management system. For example, the API risk interface may route the data to the risk decision engine.

At block 615, the data of the additional party may be compared with the data of other parties stored in a historical data database. For example, the location of the additional party, the types of goods or services offered by the additional party, etc. may be compared to other parties in the historical data database.

At block 620, based on the comparison, a risk factor for the additional party may be determined. In some embodiments, the risk factor may be a numerical value representing a likelihood of the party not providing the goods or services listed, having a poor customer service experience, etc.

At block 625, a party reason associated with the risk factor may be derived. For example, the party reason may include a textual description articulating the reason for the numerical value of the risk factor, such as "HIGH RISK LOCATION," or "RISKY MERCHANDISE."

At block 630, the risk factor (and optionally the party reason) may be provided to an API risk interface. For example, the risk decision engine may route the risk factor and/or the party reason to the API risk interface of the risk management system.

At block 635, the risk factor (and optionally the party reason) may be communicated from the API risk interface to the client system.

At block 640, interactions of the additional party with the client system may be tracked. For example, the client system may seek risk input from the risk management system regarding transactions, and those involving the additional party may be monitored. Additionally or alternatively, the client system may send batches of transactions occurring based on interactions with the client system from the client system to the risk management system. In these and other embodiments, the risk management system may obtain information from one or more third party sources, such as a third party credit card clearing company or other electronic processor.

At block 645, the risk decision engine may periodically determine an updated risk factor for the additional party based on the tracked interactions. For example, once a week (or some other periodic interval), without prompting from the client system, the risk decision engine may determine a risk factor for the additional party. In some embodiments, the periodic update may be based on At block 650, the updated risk factor may be provided to the API risk interface. For example, the risk decision engine may route the updated risk factor to the API risk interface. In some embodiments, the updated risk factor may include an associated reason explaining the rationale for the updated risk factor.

At block 655, the updated risk factor may be communicated from the API risk interface to the client system. In these and other embodiments, the communication may additionally or alternatively include the reason, for example as text, explaining the rationale for the updated risk factor.

Modifications, additions, or omissions may be made to the method 600 without departing from the scope of the present disclosure. For example, the operations of method 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 7:
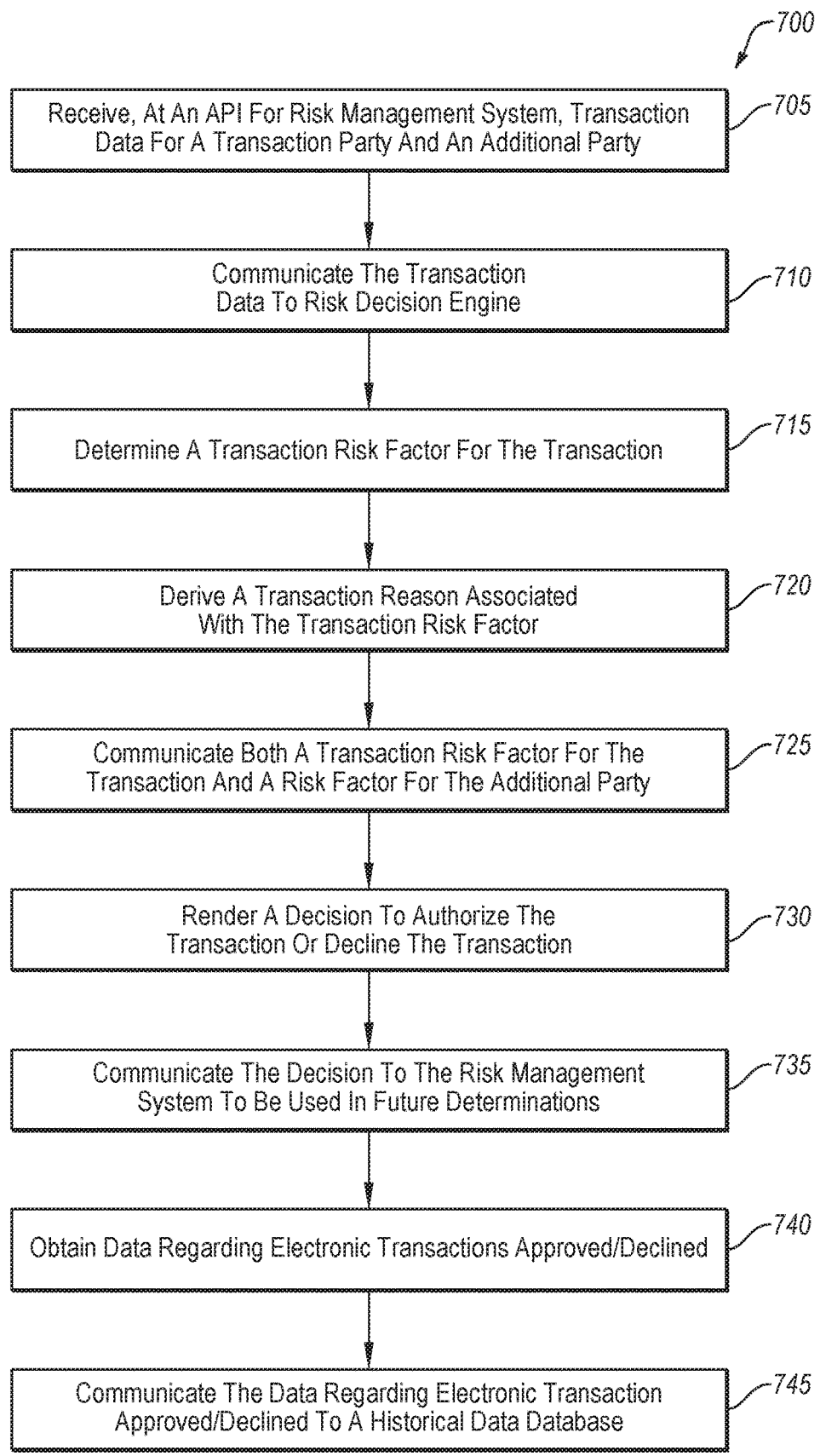
FIG. 7 illustrates a flowchart of an additional example method of interfacing with a risk management system.

FIG. 7 illustrates a flowchart of an additional example method of interfacing with a risk management system; and, in accordance with one or more embodiments of the present disclosure. The method 700 may be performed by any suitable system, apparatus, or device with respect to dispute resolution for a hosting system. For example, the client system 120 and/or the risk management system 110 of FIG. 1, or the computing system 800 of FIG. 8 may perform or direct performance of one or more of the operations associated with the method 700. Although illustrated with discrete blocks, the steps and operations associated with one or more of the blocks of the method 700 may be divided into additional blocks, combined into fewer blocks, or eliminated, depending on the particular implementation.

At block 705, transaction data for a transaction involving a transacting party and an additional party may be received at an API of a risk management system. For example, a client system may interface with the risk management system to facilitate the management of risk and may provide the transaction data to the risk management system via an API call to the API risk interface of the risk management system.

At block 710, the transaction data may be communicated from the API to the risk decision engine. For example the API risk interface may route the transaction data to the risk decision engine.

At block 715, a transaction risk factor may be determined for the transaction. For example, the risk decision engine may utilize the transaction data, the rules employed by the client system, and/or historical data to determine a risk factor for the transaction.

At block 720, a transaction reason associated with the transaction risk factor may be derived. For example, the transaction reason may include a textual description articulating the reason for the numerical value of the transaction risk factor, such as "HIGH DOLLAR AMOUNT," or "REPEATED TRANSACTIONS FROM IP ADDRESS."

At block 725, both the transaction risk factor and a risk factor for the additional party may be communicated to the client system. For example, the risk decision engine may periodically update the risk factor for the additional party such that a most recent risk factor may be provided for transactions involving goods or services listed by the additional party.

At block 730, a decision may be rendered by the client system of whether to authorize the transaction or decline the transaction. For example, despite a high risk factor for the transaction and/or the additional party, the client system may elect to authorize the transaction.

At block 735, the decision may be communicated from the client system to the risk management system to be used in future determinations. For example, the risk decision engine may utilize historical data regarding authorization and declines of transactions to inform the risk decision engine regarding whether or not a given transaction was authorized or declined to inform the risk factor determinations (e.g., a transaction authorized by the client system may lead to a lower risk factor for a similarly situated future transaction).

At block 740, data may be obtained by the risk management system regarding electronic transactions being approved or declined. For example, the risk management system may utilize a data acquisition interface to pull or otherwise acquire transaction data from the client system and/or one or more other systems, such as credit card clearing companies, ACH companies, etc.

At block 745, the data regarding the approved or declined electronic transactions may be communicated from the data acquisition interface to a historical data database. For example, the risk management system may obtain data regarding transactions involving the additional party, and may store the data in the historical data database as being associated with the additional party.

Modifications, additions, or omissions may be made to the method 700 without departing from the scope of the present disclosure. For example, the operations of method 700 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 8:
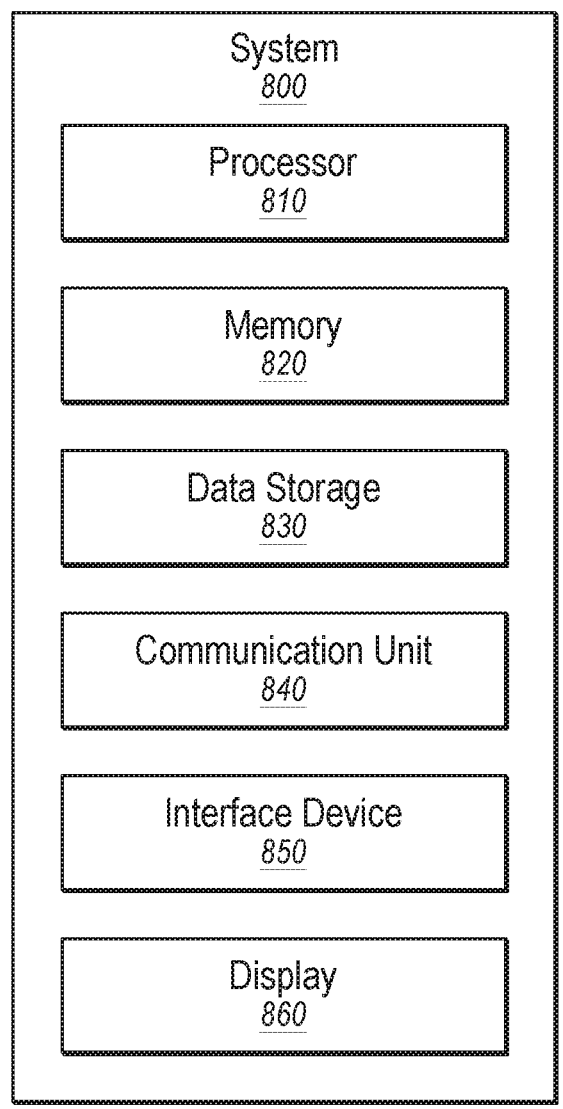
FIG. 8 illustrates an example computing system.

FIG. 8 illustrates an example computing system, according to at least one embodiment described in the present disclosure. The system 800 may include any suitable system, apparatus, or device configured to facilitate implementation of and/or interfacing with a risk management system. The computing system 800 may include a processor 810, a memory 820, a data storage 830, a communication unit 840, an interface device 850, and a display 860, which all may be communicatively coupled. The data storage 830 may include various types of data, such as computer-readable instructions to perform operations to facilitate implementation of and/or interfacing with a risk management system.

Generally, the processor 810 may include any suitable special-purpose or general-purpose computer, computing entity, or processing device including various computer hardware or software modules and may be configured to execute instructions stored on any applicable computer-readable storage media. For example, the processor 1010 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 8, it is understood that the processor 810 may include any number of processors distributed across any number of network or physical locations that are configured to perform individually or collectively any number of operations described in the present disclosure. In some embodiments, the processor 810 may interpret and/or execute program instructions and/or process data stored in the memory 820, the data storage 830, or the memory 820 and the data storage 830. In some embodiments, the processor 810 may fetch program instructions from the data storage 830 and load the program instructions into the memory 820.

After the program instructions are loaded into the memory 820, the processor 810 may execute the program instructions, such as instructions to perform one or more of the operations illustrated in the swim lane diagram 200 and/or the methods 500, 600, and/or 700 of FIGS. 2 and 5-7, respectively. For example, the processor 810 may obtain instructions regarding a user interface with elements configured to facilitate interaction with a risk management system. As another example, the processor 810 may obtain instructions regarding providing a risk factor for additional parties being added to a client system.

The memory 820 and the data storage 830 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 810. In some embodiments, the computing system 800 may or may not include either of the memory 820 and the data storage 830.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 810 to perform a certain operation or group of operations.

The communication unit 840 may include any component, device, system, or combination thereof that is configured to transmit or receive information over a network. In some embodiments, the communication unit 840 may communicate with other devices at other locations, the same location, or even other components within the same system. For example, the communication unit 840 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 840 may permit data to be exchanged with a network and/or any other devices or systems described in the present disclosure. For example, the communication unit 840 may allow the system 800 to communicate with other systems, such as computing devices and/or other networks.

The interface device 850 may include any device to allow a user to interface with the system 800. For example, the interface device 850 may include a mouse, a track pad, a keyboard, and/or a touchscreen, among other devices. The interface device 850 may receive input from a user and provide the input to the processor 810.

The display 860 may be configured as one or more displays, like an LCD, LED, or other type of display. The display 860 may be configured to present content such as video, text captions, user interfaces, and other data as directed by the processor 810. For example, when the system 800 is included in an electronic device of the client system of FIGS. 1 and/or 2, the display 860 may be configured to present a user interface such as that illustrated in FIGS. 3A, 3B, and/or 4.

Modifications, additions, or omissions may be made to the system 800 without departing from the scope of the present disclosure. For example, the data storage 830 may be multiple different storage mediums located in multiple locations and accessed by the processor 810 through a network.

As indicated above, the embodiments described in the present disclosure may include the use of a special purpose or general purpose computer (e.g., the processor 810 of FIG. 8) including various computer hardware or software modules, as discussed in greater detail below. Further, as indicated above, embodiments described in the present disclosure may be implemented using computer-readable media (e.g., the memory 820 of FIG. 8) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   generating information for a user interface to facilitate interaction with a risk management system, the user interface including:
   a first element configured to indicate a rule used by the risk management system to manage risk for a client; and
   a second element configured to indicate performance metrics of a client system of the client in managing risk;
   monitoring activity associated with the client system of the client as a plurality of electronic transactions are performed via the client system;
   determining, based on the monitored activity, whether the client system has shifted from a first category of client to a second category of client, wherein the second category of client is associated with a higher level of risk than the first category of client, wherein the determining includes:
      analyzing one or more transaction characteristics of the plurality of electronic transactions performed via the client system; and
      detecting, based on the one or more transaction characteristics, that the client system has shifted to the second category of client based on the activity associated with the client system corresponding to the higher level of risk;
   in response to the client system shifting to the second category of client, determining a recommended modification to the rule used by the risk management system to manage risk for the client, wherein the recommended modification to the rule is determined based on the shift in category of the client system from the first category of client to the second category of client, wherein the recommended modification to the rule is determined to be consistent with a set of recommended rules for the second category of client maintained by the risk management system;
   modifying the user interface to include a third element indicating the recommended modification to the rule;
   receiving an interaction with the third element to invoke the recommended modification to the rule; and
   in response to receiving the interaction with the third element to invoke the recommended modification to the rule, applying the recommended modification to the rule.

2. The method of claim 1, wherein the user interface further includes:
   a test element configured to invoke an estimation in change in performance metrics associated with using the recommended modification.

3. The method of claim 2, wherein, after invocation of the test element, the second element displays a current value of the performance metrics and an estimated change to the current value of the performance metrics using the recommended modification to the rule.

4. The method of claim 1, wherein the risk management system uses a plurality of rules to manage the risk of the client; and wherein the second element further indicates performance metrics of the risk management system for the plurality of rules collectively.

5. The method of claim 4, wherein the user interface indicates a second recommended modification to at least one rule in the plurality of rules in addition to the recommended modification to the rule; and
   wherein the user interface further includes a fifth element that, when invoked, causes the risk management system to apply both the second recommended modification and the recommended modification to the at least one rule in the plurality of rules and the rule, respectively.

6. The method of claim 1, wherein the monitored activity associated with the client system of the client includes at least one of the following types of activity:

a number of transactions undertaken using the client system;
a type of the transactions undertaken using the client system; and
a percentage of the transactions being approved by the client system.

7. The method of claim 1, wherein the interaction with the third element to invoke the recommended modification to the rule is an invocation of the third element by the user.

8. A non-transitory, computer-readable medium having instructions stored thereon that are executable by a risk management system to perform operations comprising:
generating information for a user interface to facilitate interaction with the risk management system, wherein the user interface includes:
a first element configured to indicate a rule utilized by the risk management system to manage risk for a client associated with a client system; and
a second element configured to indicate performance metrics of the client system in managing risk;
monitoring activity associated with the client system of the client as a plurality of electronic transactions are performed via the client system;
determining, based on the monitored activity, whether the client system has shifted from a first category of client to a second category of client, wherein the second category of client is associated with a higher level of risk than the first category of client, wherein the determining includes:
analyzing one or more transaction characteristics of the plurality of electronic transactions performed via the client system; and
detecting, based on the one or more transaction characteristics, that the client system has shifted to the second category of client based on the activity associated with the client system corresponding to the higher level of risk;
in response to the client system shifting to the second category of client, determining a recommended modification to the rule utilized by the risk management system to manage risk for the client, wherein the recommended modification to the rule is determined based on the shift in category of the client system from the first category of client to the second category of client, wherein the recommended modification to the rule is determined to be consistent with a set of recommended rules for the second category of client maintained by the risk management system;
modifying the user interface to include a third element indicating the recommended modification to the rule;
receiving an interaction with the third element to invoke the recommended modification to the rule; and
in response to receiving the interaction with the third element to invoke the recommended modification to the rule, applying the recommended modification to the rule.

9. The non-transitory, computer-readable medium of claim 8, wherein the user interface includes: a test element configured to invoke an estimation in change in performance metrics associated with using the recommended modification to the rule.

10. The non-transitory, computer-readable medium of claim 9, wherein, after invocation of the test element, the second element displays a current value of the performance metrics and an estimated change to the current value of the performance metrics using the recommended modification to the rule.

11. The non-transitory, computer-readable medium of claim 8, further comprising:
storing the monitored activity of the client in a historical data database maintained by the risk management system; and
wherein determining whether the client system has shifted from the first category of client to the second category of client, and applying the recommended modification to the rule are both performed by a risk decision engine accessing the historical data database.

12. The non-transitory, computer-readable medium of claim 8, further comprising:
in response to the client system shifting to the second category of client, determining a second recommended modification to at least one additional rule utilized by the risk management system to manage risk for the client, wherein the second recommended modification to the at least one additional rule is determined based on the shift in category of the client system from the first category of client to the second category of client, wherein the second recommendation modification to the at least one additional rule is determined to be consistent with a set of recommended rules for the second category of client maintained by the risk management system;
modifying the user interface to include an additional element indicating the second recommended modification to the at least one additional rule;
receiving an interaction with the additional element to invoke the second recommended modification to the at least one additional rule; and
in response to receiving the interaction with the additional element to invoke the second recommended modification to the at least one additional rule, applying the second recommended modification to the at least one additional rule.

13. The non-transitory, computer-readable medium of claim 12, wherein the user interface includes a fifth element that, when invoked, causes the risk management system to apply both the recommended modification and the second recommended modification to the rule and the at least one additional rule, respectively.

14. A risk management system, comprising:
at least one processor;
a non-transitory, computer-readable medium having instructions stored thereon that are executable by the at least one processor to cause the risk management system to:
generate information for a user interface operable to facilitate interaction with the risk management system, the user interface including:
a first element indicating a rule used by the risk management system to manage risk for a client associated with a client system; and
a second element indicating performance metrics of the client system in managing risk;
monitor activity associated with the client system of the client as a plurality of electronic transactions are performed via the client system;
determine, based on the monitored activity, whether the client system has shifted from a first category of client to a second category of client, wherein the risk management system maintains a first set of recommended rules for the first category of client and a second set of recommended rules for the second category of client, wherein the second category of client is associated with a higher level of risk than the first category of client, wherein the determining includes:
analyzing one or more transaction characteristics of the plurality of electronic transactions performed via the client system; and
detecting, based on the one or more transaction characteristics, that the client system has shifted to the second category of client based on the activity associated with the client system corresponding to the higher level of risk;
in response to the client system shifting to the second category of client, determine a recommended modification to the rule used by the risk management system to manage risk for the client, wherein the recommended modification to the rule is determined based on the shift in category of the client system from the first category of client to the second category of client, wherein the recommended modification is determined to be consistent with the second set of recommended rules for the second category of client being maintained by the risk management system;
modify the user interface to include a third element indicating the recommended modification to the rule;
receive an interaction with the third element to invoke the recommended modification to the rule; and
in response to receiving the interaction with the third element to invoke the recommended modification to the rule, apply the recommended modification to the rule.

15. The system of claim 14, wherein the user interface includes:
a test element configured to invoke an estimation in change in performance metrics associated with the recommended modification.

16. The system of claim 15, wherein, after invocation of the test element, the second element displays a current value of the performance metrics and an estimated change to the current value of the performance metrics using the recommended modification to the rule.

17. The system of claim 14, further causing the risk management system to:
store the monitored activity of the client in a historical data database maintained by the risk management system; and
wherein determining that the client system is shifted into the second category of client, and applying the recommended modification to the rule are both performed by a risk decision engine accessing the historical data database.

18. The system of claim 14, wherein the instructions that are executable by the at least one processor include instructions that are executable to include a fifth element in the user interface that is invocable to apply the recommended modification to the rule along with any recommended modifications to additional rules used by the risk management system to manage risk for the client associated with the client system.

* * * * *